(12) United States Patent
Barua et al.

(10) Patent No.: US 7,614,312 B2
(45) Date of Patent: Nov. 10, 2009

(54) MULTI-PHASE CORIOLIS FLOWMETER

(75) Inventors: Santanu Barua, Mumbai (IN); Robbie Lansangan, Houston, TX (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 11/780,918

(22) Filed: Jul. 20, 2007

(65) Prior Publication Data
US 2008/0034890 A1 Feb. 14, 2008

Related U.S. Application Data

(60) Provisional application No. 60/820,032, filed on Jul. 21, 2006.

(51) Int. Cl.
G01F 1/84 (2006.01)
G01F 1/74 (2006.01)

(52) U.S. Cl. .............. 73/861.356; 73/861.04; 702/45

(58) Field of Classification Search ............... 73/861.354–861.357
See application file for complete search history.

(56) References Cited

U.S. PATENT DOCUMENTS

| | | | |
|---|---|---|---|
| 5,551,305 A * | 9/1996 | Farchi et al. ............. 73/861.04 |
| 6,471,487 B2 | 10/2002 | Keilty et al. | |
| 6,505,519 B2 * | 1/2003 | Henry et al. ............. 73/861.356 |
| 6,758,102 B2 * | 7/2004 | Henry et al. ............. 73/861.356 |
| 6,981,424 B2 * | 1/2006 | Henry et al. ............. 73/861.356 |
| 7,013,715 B2 | 3/2006 | Dutton et al. | |
| 7,059,199 B2 | 6/2006 | Mattar et al. | |
| 7,072,775 B2 * | 7/2006 | Hemp et al. ................... 702/45 |
| 7,117,717 B2 * | 10/2006 | Mattar et al. ............... 73/19.03 |
| 7,188,534 B2 * | 3/2007 | Tombs et al. ............ 73/861.356 |
| 7,207,229 B2 * | 4/2007 | Mattar et al. ............ 73/861.354 |
| 7,257,988 B2 * | 8/2007 | Mattar et al. ............ 73/861.356 |
| 2005/0193832 A1 * | 9/2005 | Tombs et al. ................... 73/861 |
| 2008/0053240 A1 * | 3/2008 | Henry et al. ............. 73/861.04 |

OTHER PUBLICATIONS

International Search Report mailed Jan. 10, 2008 for International Application No. PCT/US07/74011, filed Jul. 20, 2007, 4 pages.
Written Opinion mailed Jan. 10, 2008 for International Application No. PCT/US07/74011, filed Jul. 20, 2007, 5 pages.

* cited by examiner

Primary Examiner—Harshad Patel
(74) Attorney, Agent, or Firm—Fish & Richardson P.C.

(57) ABSTRACT

A Coriolis flowmeter is configured to determine a first property of a multi-phase fluid. A flow model is configured to determine a second property of the multi-phase fluid. A determination system is configured to determine a third property of the multi-phase fluid based, at least in part, on the first property and the second property.

14 Claims, 5 Drawing Sheets

MULTI-PHASE CORIOLIS FLOWMETER

CLAIM OF PRIORITY

This application claims priority under 35 USC §119(e) to U.S. Patent Application Ser. No. 60/820,032, filed on Jul. 21, 2006, the entire contents of which are hereby incorporated by reference.

TECHNICAL FIELD

This description relates to flowmeters.

BACKGROUND

Flowmeters provide information about materials being transferred through a conduit, or flowtube. For example, mass flowmeters provide an indication of the mass of material being transferred through a conduit. Mass flowmeters also may provide an indication of the density of the material.

For example, Coriolis-type mass flowmeters are based on the Coriolis effect, in which material flowing through a conduit is affected by a Coriolis force and therefore experiences an acceleration. Many Coriolis-type mass flowmeters induce a Coriolis force by sinusoidally oscillating a conduit about a pivot axis orthogonal to the length of the conduit. In such mass flowmeters, the Coriolis reaction force experienced by the traveling fluid mass is transferred to the conduit itself and is manifested as a deflection or offset of the conduit in the direction of the Coriolis force vector in the plane of rotation.

SUMMARY

In one aspect, a Coriolis flowmeter is configured to determine a first property of a multi-phase fluid. A flow model is configured to determine a second property of the multi-phase fluid. A determination system is configured to determine a third property of the multi-phase fluid based, at least in part, on the first property and the second property.

Implementations may include one or more of the following features. For example, a sensor may be configured to sense a fourth property associated with the multi-phase fluid, and the flow model may be configured to determine the second property based on the fourth property. The fourth property may be a pressure or temperature associated with the multi-phase fluid.

The Coriolis flowmeter may be configured to determine a fourth property of the multi-phase fluid. The determination system may be configured to determine the third property of the multi-phase fluid based, at least in part, on the first property, the second property, and the fourth property. The first property may be a bulk density of the multi-phase fluid, the second property may be a water-cut or gas void fraction of the multi-phase fluid, and the fourth property may be a bulk mass flow rate of the multi-phase fluid. The third property may be a mass flow rate or a volumetric flow rate of a component of the multi-phase fluid.

In another aspect, a bulk density determination system determines a bulk density of a multi-phase fluid. A mass flow rate determination system determines a bulk mass flow rate of the multi-phase fluid. A pressure sensor is configured to determine a pressure associated with the multi-phase fluid. A flow model is configured to determine water-cut or gas void fraction of the multi-phase fluid based, at least in part, on the sensed pressure. A flow rate determination system determines a flow rate of at least one component of the multi-phase fluid based on the bulk density, the bulk mass flow rate, and the water-cut or gas void fraction.

In another aspect, a first property of a multi-phase fluid is determined using a Coriolis flowmeter. A second property of the multi-phase fluid is determined using a mathematical model of a flow of the multi-phase fluid through a conduit. A third property of the multi-phase fluid based is determined, at least in part, on the first property and the second property.

Implementations may include one or more of the following features. A fourth property associated with the multi-phase fluid may be determined and the second property may be determined by inputting the fourth property into the mathematical model. The fourth property may be a pressure or temperature associated with the multi-phase fluid.

A fourth property of the multi-phase fluid may be determined and the third property of the multi-phase fluid may be determined based, at least in part, on the first property, the second property, and the fourth property. The first property may be a bulk density of the multi-phase fluid, the second property may be a water-cut or gas void fraction of the multi-phase fluid, and the fourth property may be a bulk mass flow rate of the multi-phase fluid. The third property may be a mass flow rate or a volumetric flow rate of a component of the multi-phase fluid.

In another aspect, a bulk density of a multi-phase fluid is determined. A bulk mass flow rate of the multi-phase fluid is determined. A pressure associated with the multi-phase fluid is determined. A flow rate of at least one component of the multi-phase fluid based on the bulk density, the bulk mass flow rate, and the pressure.

Implementations may include one or more of the following features. For example, determining a flow rate of at least one component of the multi-phase fluid based on the bulk density, the bulk mass flow rate, and the pressure may include determining a water-cut or gas void fraction of the multi-phase fluid based, at least in part, on the pressure; and determining a flow rate of at least one component of the multi-phase fluid based on the bulk density, the bulk mass flow rate, and the water-cut or gas void fraction. Determining the water-cut or gas void fraction of the multi-phase fluid based, at least in part, on the pressure may include using a flow model to determine the water-cut or gas void fraction based on the pressure.

In another aspect, a bulk density of a multi-phase fluid is determined using a Coriolis flowmeter that includes a flowtube. A bulk mass flow rate of the multi-phase fluid is determined using the Coriolis flowmeter. An inlet and outlet pressure of the multi-phase fluid is determined at an inlet and outlet, respectively, of the flowtube. An inlet and outlet temperature of the multi-phase fluid is determined at the inlet and outlet, respectively, of the flowtube. A water-cut or gas void fraction of the multi-phase fluid is determined based on the bulk density, the bulk mass flow rate, the inlet pressure, the outlet pressure, and the inlet temperature. A flow rate of at least one component of the multi-phase fluid is determined based on the bulk density, the bulk mass flow rate, and the water-cut or gas void fraction.

Implementations may include one or more of the following features. For example, determining the water-cut or gas void fraction of the multi-phase fluid may include using a mathematical model of a flow of the multi-phase fluid through the flowtube to determine the water-cut or gas void fraction of the multi-phase fluid based on the bulk density, the bulk mass flow rate, the inlet pressure, the outlet pressure, and the inlet temperature.

DETAILED DESCRIPTION

Types of flowmeters include digital flowmeters. For example, U.S. Pat. No. 6,311,136, which is hereby incorporated by reference, discloses the use of a digital flowmeter and related technology including signal processing and measurement techniques. Such digital flowmeters may be very precise in their measurements, with little or negligible noise, and may be capable of enabling a wide range of positive and negative gains at the driver circuitry for driving the conduit. Such digital flowmeters are thus advantageous in a variety of settings. For example, commonly-assigned U.S. Pat. No. 6,505,519, which is incorporated by reference, discloses the use of a wide gain range, and/or the use of negative gain, to prevent stalling and to more accurately exercise control of the flowtube, even during difficult conditions such as two-phase flow (e.g., a flow containing a mixture of liquid and gas) or three-phase flow (e.g., a gas and two different liquids).

Although digital flowmeters are specifically discussed below with respect to, for example, FIGS. 1 and 2, it should be understood that analog flowmeters also exist. Although such analog flowmeters may be prone to typical shortcomings of analog circuitry, e.g., low precision and high noise measurements relative to digital flowmeters, they also may be compatible with the various techniques and implementations discussed herein. Thus, in the following discussion, the term "flowmeter" or "meter" is used to refer to any type of device and/or system in which a Coriolis flowmeter system uses various control systems and related elements to measure a mass flow, density, and/or other parameters of a material(s) moving through a flowtube or other conduit.

Figure 1A:
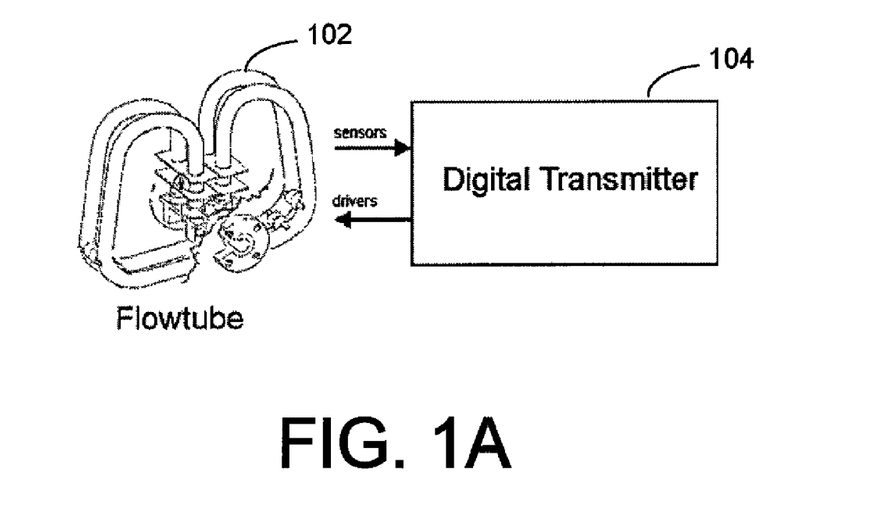
FIG. 1A is an illustration of a Coriolis flowmeter using a bent flowtube.

FIG. 1A is an illustration of a digital flowmeter using a bent flowtube 102. Specifically, the bent flowtube 102 may be used to measure one or more physical characteristics of, for example, a (traveling) fluid, as referred to above. In FIG. 1A, a digital transmitter 104 exchanges sensor and drive signals with the bent flowtube 102, so as to both sense an oscillation of the bent flowtube 102, and to drive the oscillation of the bent flowtube 102 accordingly. By quickly and accurately determining the sensor and drive signals, the digital transmitter 104, as referred to above, provides for fast and accurate operation of the bent flowtube 102. Examples of the digital transmitter 104 being used with a bent flowtube are provided in, for example, commonly-assigned U.S. Pat. No. 6,311,136.

Figure 1B:
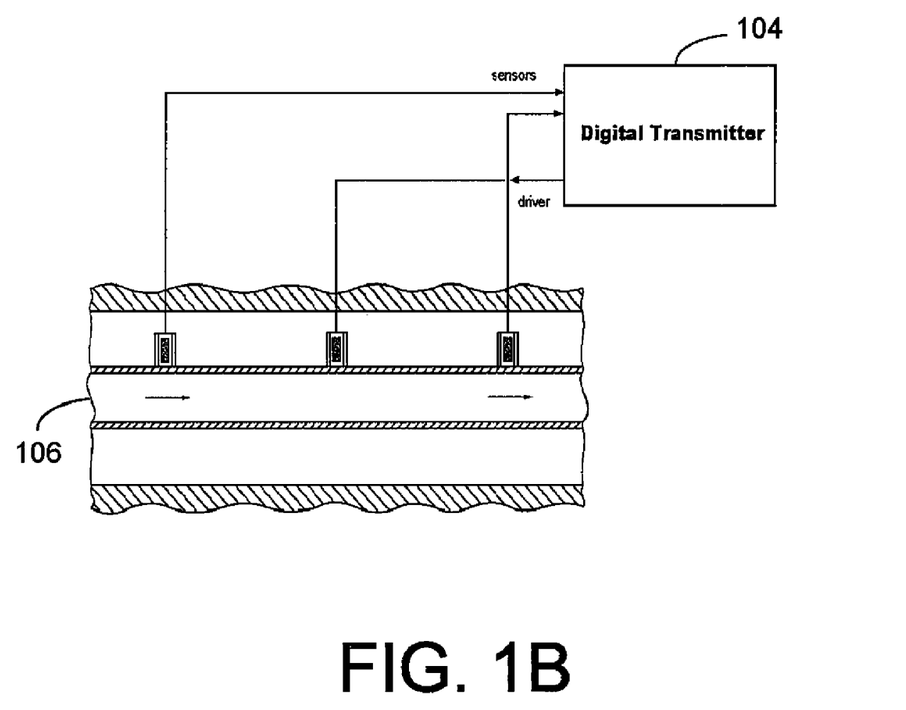
FIG. 1B is an illustration of a Coriolis flowmeter using a straight flowtube.

FIG. 1B is an illustration of a digital flowmeter using a straight flowtube 106. More specifically, in FIG. 1B, the straight flowtube 106 interacts with the digital transmitter 104. Such a straight flowtube operates similarly to the bent flowtube 102 on a conceptual level, and has various advantages/disadvantages relative to the bent flowtube 102. For example, the straight flowtube 106 may be easier to (completely) fill and empty than the bent flowtube 102, simply due to the geometry of its construction. In operation, the bent flowtube 102 may operate at a frequency of, for example, 50-110 Hz, while the straight flowtube 106 may operate at a frequency of, for example, 300-1,000 Hz. The bent flowtube 102 represents flowtubes having a variety of diameters, and may be operated in multiple orientations, such as, for example, in a vertical or horizontal orientation.

Figure 2:
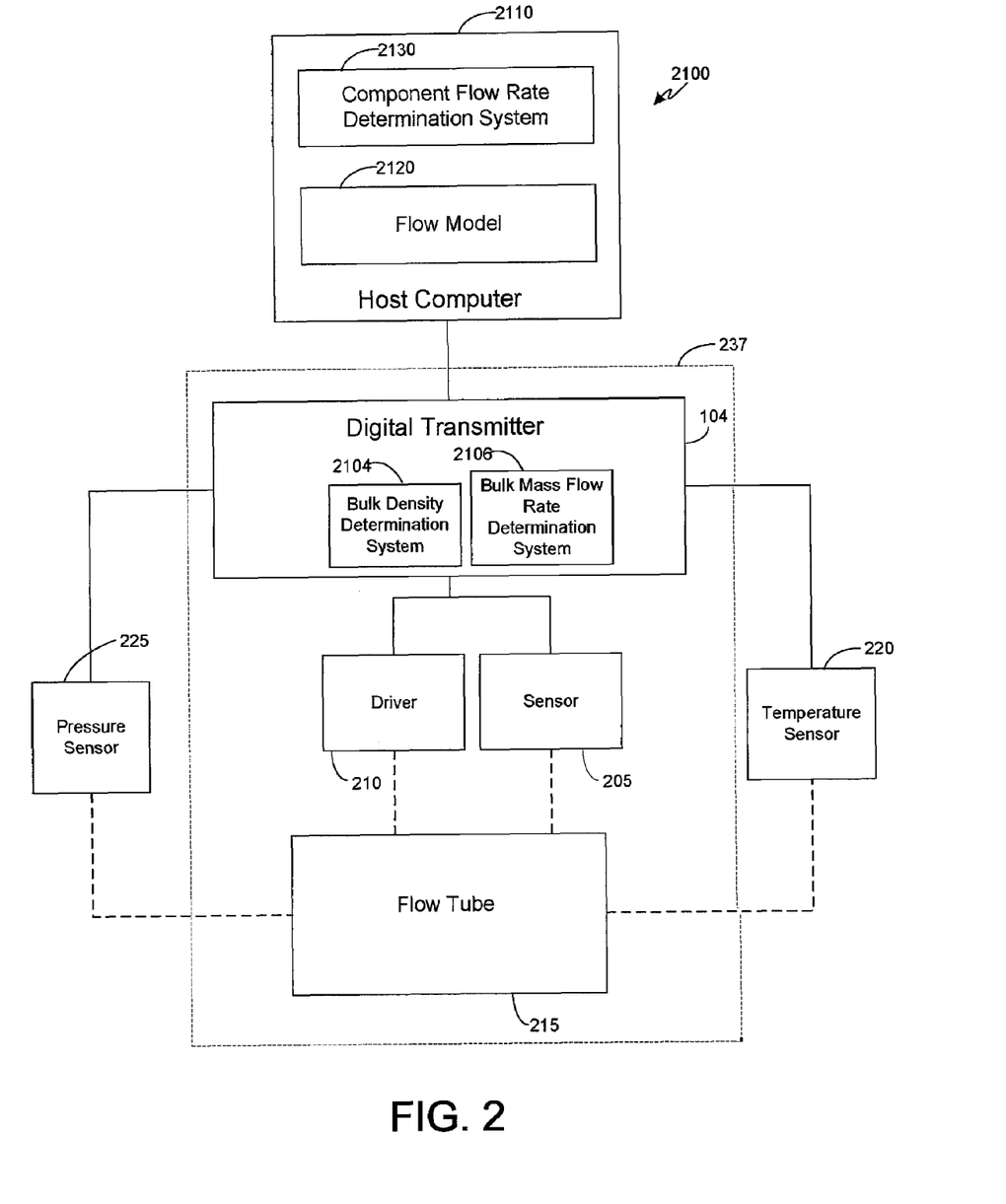
FIG. 2 is a block diagram of a flowmeter system.

FIG. 2 is a block diagram of a flowmeter system 2100. Flowmeter system 2100 may be used to measure properties of the individual components in mixed flows. For example, a "three-phase" flow or "mixed two-phase flow" refers to a situation in which two types of liquid are mixed with a gas. For example, a flowing mixture of oil and water may contain air (or another gas), thus forming a "three-phase flow," where the terminology refers to the three components of the flow, and does not generally imply that a solid material is included in the flow. In such a situation, it may be useful to determine properties (e.g., the mass or volumetric flow rates) of the individual components of the fluid.

To determine the properties of the individual components in a three-phase flow, three independent properties of the bulk fluid may be needed. In general, a Coriolis flowmeter can provide accurate measurements of the bulk density and the bulk mass flow rate of a three-phase fluid. However, these two independent properties of the bulk fluid may not be enough information to determine properties of the three individual components of the fluid. Thus, one implementation of the flowmeter system 2100 uses the pressure drop across the Coriolis flowmeter, and specifically the pressure drop across the flowtube 215, as an additional property of the bulk fluid to enable the determination of the properties of the three individual components.

In particular, the following description describes an implementation of flowmeter system 2100 that is used to determine individual component flow rates (mass and/or volumetric) within a three-phase flow. Specifically, the implementation described determines the flow rates of the individual components in an oil-water-gas three phase flow. However, other implementations may determine different properties of the individual components of the fluid flow, and the individual components may include materials other than oil, water, and gas.

Furthermore, the implementation described uses the inlet pressure of the Coriolis flowtube 215, the outlet pressure of the Coriolis flowtube 215, and inlet temperature as inputs into a mathematical model of the fluid flow through the Coriolis flowtube 215 so that the mathematical model can determine the water-cut, which is then used to determine the flow rates of the individual components. Other implementations, however, may determine the water-cut using a mathematical flow model that relies on other inputs (and, hence, an independent property of the bulk flow other than the pressure drop across the Coriolis flowtube). Similarly, other implementations may use the mathematical model to determine a property other than water-cut (based on pressure or other types of inputs), which is then used to determine the desired property or properties of the individual components. For instance, the gas void fraction may be determined instead of, or in addition to, the water-cut.

In general, the flowmeter system 2100 uses properties of the fluid determined by a Coriolis meter plus a mathematical model of the fluid flow through the Coriolis flowtube. As described, a Coriolis flowmeter can generally provide accurate measurements of the bulk density and the bulk mass flow rate of a three-phase fluid. The mathematical model uses the pressure drop across the Coriolis flowtube to determine an additional property of the fluid, such as the water-cut (percentage of water in the oil-water mixture) or gas void fraction. This additional property is then used in conjunction with the properties determined by the Coriolis flowmeter to determine the flow rates of the individual components of the fluid.

In particular, the flowmeter system 2100 includes a digital mass flowmeter (e.g., Coriolis flowmeter) 237, a pressure sensor 225, a temperature sensor 220, and a host computer 2110. The digital mass flowmeter 237 includes the digital transmitter 104, one or more motion sensors 205, one or more drivers 210, and a flowtube 215 (which also may be referred to as a conduit, and which may represent either the bent flowtube 102, the straight flowtube 106, or some other type of flowtube).

The digital transmitter 104 may be implemented using one or more of, for example, a processor, a Digital Signal Processor (DSP), a field-programmable gate array (FPGA), an ASIC, other programmable logic or gate arrays, or programmable logic with a processor core. It should be understood that, as described in U.S. Pat. No. 6,311,136, associated digital-to-analog converters may be included for operation of the drivers 210, while analog-to-digital converters may be used to convert sensor signals from the sensors 205 for use by the digital transmitter 104.

The digital transmitter 104 includes a bulk density determination system 2104, and a bulk mass flow rate determination system 2106 to generate measurements of bulk density and bulk mass flow rate of a material flowing through the flowtube 215, based at least on signals received from the motion sensors 205. The digital transmitter 104 also controls the drivers 210 to induce motion in the flowtube 215. This motion is sensed by the motion sensors 205.

Density measurements of the material flowing through the flowtube are related to, for example, the frequency of the motion of the flowtube 215 that is induced in the flowtube 215 by a driving force supplied by the drivers 210, and/or to the temperature of the flowtube 215. Similarly, mass flow through the flowtube 215 is related to the phase and frequency of the motion of the flowtube 215, as well as to the temperature of the flowtube 215. Generally, under multi-phase flow conditions (e.g., three-phase flow), the bulk density refers to the density of the flowing material as a whole, as opposed to the density of the individual components making up the multi-phase material. Similarly, under such conditions, the bulk mass flow rate refers to the mass flow rate of the material as a whole, as opposed to the mass flow rates of the individual components.

In FIG. 2, it should be understood that the various components of the digital transmitter 104 are in communication with one another, although communication links are not explicitly illustrated, for the sake of clarity. Further, it should be understood that conventional components of the digital transmitter 104 are not illustrated in FIG. 2, but are assumed to exist within, or be accessible to, the digital transmitter 104. For example, the digital transmitter 104 will typically include the drive circuitry for generating and supplying a drive signal to the driver 210.

The temperature sensor 220 is in communication with the transmitter 104 and measures the temperature of the flowing material at the inlet of the flowtube 215. The pressure sensor 225 is in communication with the transmitter 104, and is connected to the flowtube 215 so as to be operable to sense a pressure of a material flowing through the flowtube 215 at the inlet and the outlet of flow tube 215 (either by measuring the pressure at both the inlet and outlet, or by measuring the pressure at one or the other in addition to the differential pressure). If the inlet and outlet pressures are explicitly measured, pressure sensor 225 may actually be composed of two sensors—one at the inlet, and one at the outlet.

The temperature and pressure may be used by transmitter 104, and specifically by bulk density determination system 2104 and bulk mass flow rate determination system 2106, to more accurately determine the bulk density and bulk mass flow rate. For instance, the temperature of the fluid in the flowtube 215 may affect certain properties of the flowtube, such as its stiffness and dimensions. The digital transmitter 104 may compensate for these temperature effects.

A host computer 2110 is coupled to the digital transmitter 104 and may read the bulk density, the bulk mass flow rate, the inlet pressure, the outlet pressure and the inlet temperature from the transmitter 104. Host computer 2110 executes a flow model 2120 and a component flow rate determination system 2130.

The flow model 2120 is a mathematical model of the flow of fluid through flowtube 215. Flow model 2120 may be implemented using a software system that provides for the modeling of fluid flow through a conduit or a series of conduits and connecting components. Generally, such flow modeling software systems are commercially available. Examples of commercially available flow modeling software systems include Pipephase® from SIMSCI-ESSCOR, Pipesim from Schlumberger, and Flowmaster2 from Flowmaster, Ltd. Flow model 2120 may be developed for a given Coriolis flowtube geometry and expected fluid composition.

For instance, flow model 2120 may include a pipe network that represents the Coriolis flowtube 215 and that models the fluid as a three-phase flow of oil, water, and gas. If flowtube 215 has the geometry shown in FIG. 1A, the pipe network may include two parallel links that include bends and straight pipe sections that correspond to the geometry of the flowtube shown in FIG. 1A.

The host computer 2110 reads the bulk mass flow rate, the bulk density, the inlet pressure, the outlet pressure, and the inlet temperature from the digital transmitter 104 (or a storage which stores the information from the transmitter 104). The flow model 2120 then uses the inlet pressure and inlet temperature to determine the water cut of the fluid (or, alternatively, in other implementations the flow model may determine the gas void fraction). To that end, the flow model may use the densities of the individual components, the inlet pressure, inlet temperature, the bulk density, and the bulk mass flow rate to determine a water-cut vs. outlet pressure curve. The densities of the individual components may be known beforehand and assumed to be constant, or the flow model 2120 may calculate these densities based on the inlet temperature, the inlet pressure, and the specific gravity of the gas (which is typically known). The water-cut vs. outlet pressure curve and the actual outlet pressure is then used to determine the actual water-cut of the fluid.

To determine the water-cut vs. outlet pressure curve, the flow model 2120 may vary the mole fraction of the components to vary the water-cut and the gas void fraction in a way that keeps constant the measured bulk density and bulk mass flow rate. For example, the flow model 2120 may determine the mole fractions of the components for the water-cut equal to 10%, 20%, 30%, 40%, 50%, 60%, 70%, 80%, 90%, and 100%. For each percentage of water-cut, the flow model 2120 then may use the mole fractions of the components, with the inlet temperature and inlet pressure, to calculate the corresponding outlet pressure.

The component flow rate determination system 2130 then interpolates these points and uses the actual, measured outlet pressure to determine the actual water-cut of the fluid. That is, the determination system 2130 determines the point on the interpolated curve corresponding to the actual, measured pressure, with the corresponding water-cut value being accepted as the actual water-cut. Based on the water-cut, the bulk mass density, the bulk mass flow rate, and the densities of the individual components, the component flow rate determination system 2130 then calculates the mass and/or volumetric flowrates of the individual components. To do so, the component flow rate determination system 2130 may use the following equations:

| | | |
|---|---|---|
| Mixture volumetric-flow-rate: | $qT =$ | WT/DENTP |
| Liquid density: | $DENL =$ | $DENO*(1.0 - WC) + DENW*WC$ |
| Gas-void-fraction: | $GVF =$ | $(DENL - DENTP)/(DENL - DENG)$ |
| Gas-volumetric flow rate: | $qG =$ | $GVF * qT$ |
| Gas-mass flow rate: | $wG =$ | $qG * DENG$ |
| Liquid-volumetric flow rate: | $qL =$ | $(1 - GVF)*qT$ |
| Oil-volumetric flow rate: | $qO =$ | $(1.0 - WC)*qL$ |
| Oil-mass flow rate: | $wO =$ | $qO * DENO$ |
| Water-volumetric flow rate: | $qW =$ | $WC * qL$ |
| Water mass flow rate: | $wW =$ | $qW * DENW$ |
| where: | | |
| wG: | In-situ gas mass-flow rate | |
| wO: | In-situ oil mass-flow rate | |
| wW: | In-situ water mass-flow rate | |
| qG: | In-situ gas volumetric-flow rate | |
| qO: | In-situ oil volumetric -flow rate | |
| qW: | In-situ water volumetric -flow rate | |
| qL | In-situ liquid volumetric flowrate | |
| GVF: | In-situ gas-volume-fraction | |
| qT | Bulk volumetric flowrate | |
| WT | Bulk mass flow rate | |
| DENTP | Bulk density | |
| DENL | Density of liquid | |
| DENO | Density of oil | |
| DENW | Desnity of water | |
| DENG | Density of gas | |
| WC | Water-cut | |

Some commercially available flow modeling software systems, such as Pipephase®, have an open architecture that enables the development of a main-driver program in a programming language such as Fortran or C++ or Visual Basic (VB). Pipephase®, for example, provides an API that allows such a driver program to make custom automatic calls to Pipephase, manipulate Pipephase model variables as desired, and access the desired results of the model. As a result, the component flow rate determination system 2130 may be implemented as a driver program that uses the APIs of the software implementing the flow model 2120 to determine the water-cut vs. outlet pressure points for the fluid. For example, the driver program may be implemented to access the data from the transmitter 104 (or, in other implementations, a storage of the data, such as a historian), to provide the data to the flow model 2120, and initiate the flow model 2120 to determine the water-cut vs. outlet pressure points. The driver program then may access these points from the flow model 2120, interpolate these points, use the actual outlet pressure to determine the actual water-cut, and then calculate the flow rates as described above.

While not described explicitly, the bulk density and bulk mass flow rate measurements performed by the bulk density determination system 2104 and the bulk mass flow rate determination system 2106 may be corrected bulk density measurements and corrected mass flow rate measurements. In general, the presence of gas in the fluid flow may affect both an actual and a measured value of a density of the fluid flow, resulting in the density measurement to be, and to read, lower than if the fluid flow contained only the liquid component. Thus, the apparent bulk density may be different from the actual bulk density. Similarly, the apparent mass flow rate may be different from the actual mass flow rate. Thus, the bulk density determination system 2104 and the bulk mass flow rate determination system 2106 may correct the initial/apparent measurements of bulk density and mass flow rate, respectively, so that these items are closer to the true density and true mass flow rate.

Also, while the flowmeter system 2100 is described as using a host computer 2110 that implements the flow model 2120 and component flow rate determination system 2130, one or both of these items may be implemented in the digital transmitter 104. For instance, if the processing power of the transmitter is sufficient, the flow model 2120 and determination system 2130 may be implemented on the transmitter 104 with analytical flow modeling software such as Pipephase®. However, if processing power is limited, other techniques may be used to obtain properties such as water-cut from the inlet temperature, inlet pressure, outlet pressure, and densities of the components. For example, a neural network may be implemented in the transmitter 104. The neural network would be trained with training data that includes various values of inlet temperature, inlet pressure, and outlet pressure and the corresponding water-cut values. The inputs may also include various densities of the components, or the neural network may be trained for a particular set of density values of the components (and, hence, density is not specifically needed because the other training data is only valid for the particular set of density values). A component flow rate determination system implemented in the transmitter 104 (or, e.g., on host computer 2110) then uses the water-cut output by the neural network, along with the bulk density and bulk mass flow rate, to determine the flow rates of the individual components.

As implicated above, in some implementations, the data from the Coriolis meter 237 may be output to a historian database, and then accessed from the historian by the host computer 2110 (rather than the host computer 2110 accessing or receiving it directly from the transmitter 104). This may be particularly advantageous when the flow model 2120 is implemented on the host computer 2110 using an analytical flow model software system. In such a situation, the transmitter 104 may produce data at a much more frequent rate than the flow model 2120 and determination system 2130 can process the data to determine the flow rates. For instance, flow model 2120 and determination system 2130 may take a second or two to process the data to determine the flow rates, while the transmitter 104 may output data every few milliseconds. Thus, the transmitter 104 may output data much faster than the flow model 2120 and determination system 2130 can handle. Using the historian database allows this data to be stored until the flow model 2120 and determination system 2130 can access it.

Furthermore, in such situations, it may be advantageous to average the data produced by the transmitter 104 over a period of time, such as a second or two, and to use the averaged data as the inputs to the flow model 2120 and the determination system 2130. Alternatively, the host computer 2110 could just read the data points that occur every second or two (rather than averaging over the period).

In general, it should be appreciated that the system 2100 and the various implementations thereof may allow for all or substantially all of the three-phase fluid flow to flow continuously through the flowtube 215 and through an associated pipe or other conduit for transporting the three-phase flow material. As a result, determinations of individual component flow rates do not require separation of the three-phase fluid flow into separate flows containing one or more of the constituent components. For example, when the three-phase flow contains oil, water, and gas, it is not necessary to separate the gas from the oil/water liquid combination in order to perform measurements (e.g., mass flow rate) on the oil portion of the resulting oil/liquid flow. Accordingly, reliable measurements of an amount of oil produced, for example, at an oil production facility, may be made easily, quickly, inexpensively, and reliably.

Figure 3A:
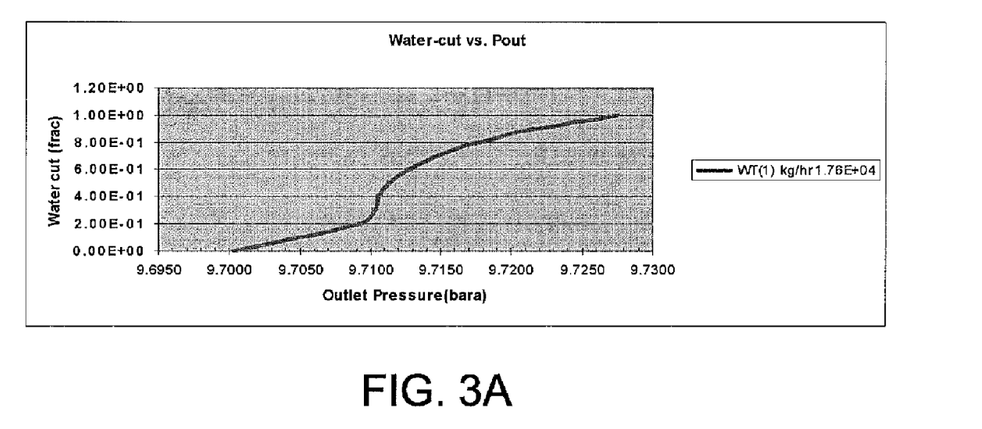
FIG. 3A illustrates a interpolated water-cut vs. outlet pressure curve.
Figure 3B:
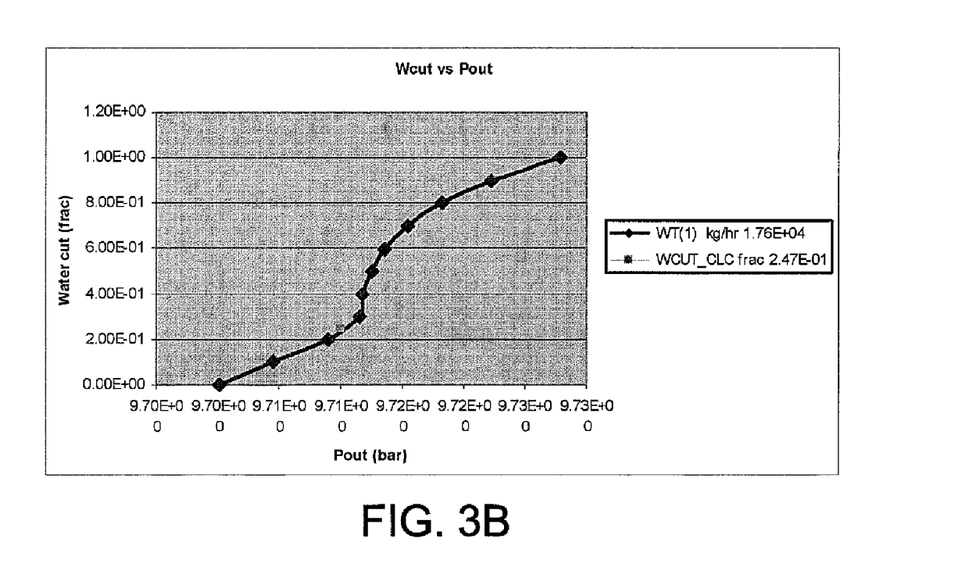
FIG. 3B shows the curve of FIG. 3A with indications of the data points calculated by a flow model and an indication of the point on the interpolated curve were the actual outlet pressure is located.

FIG. 3A illustrates a interpolated water-cut vs. outlet pressure curve that may be generated, for example, by component flow rate determination system 2130. FIG. 3B shows the curve with indications of the data points calculated by the flow model 2120 shown as triangles, and an indication of the point on the interpolated curve where the actual outlet pressure is located shown as a square. The point on the interpolated curve where the actual outlet pressure is located corresponds to a water-cut of 0.24.

Figure 4:
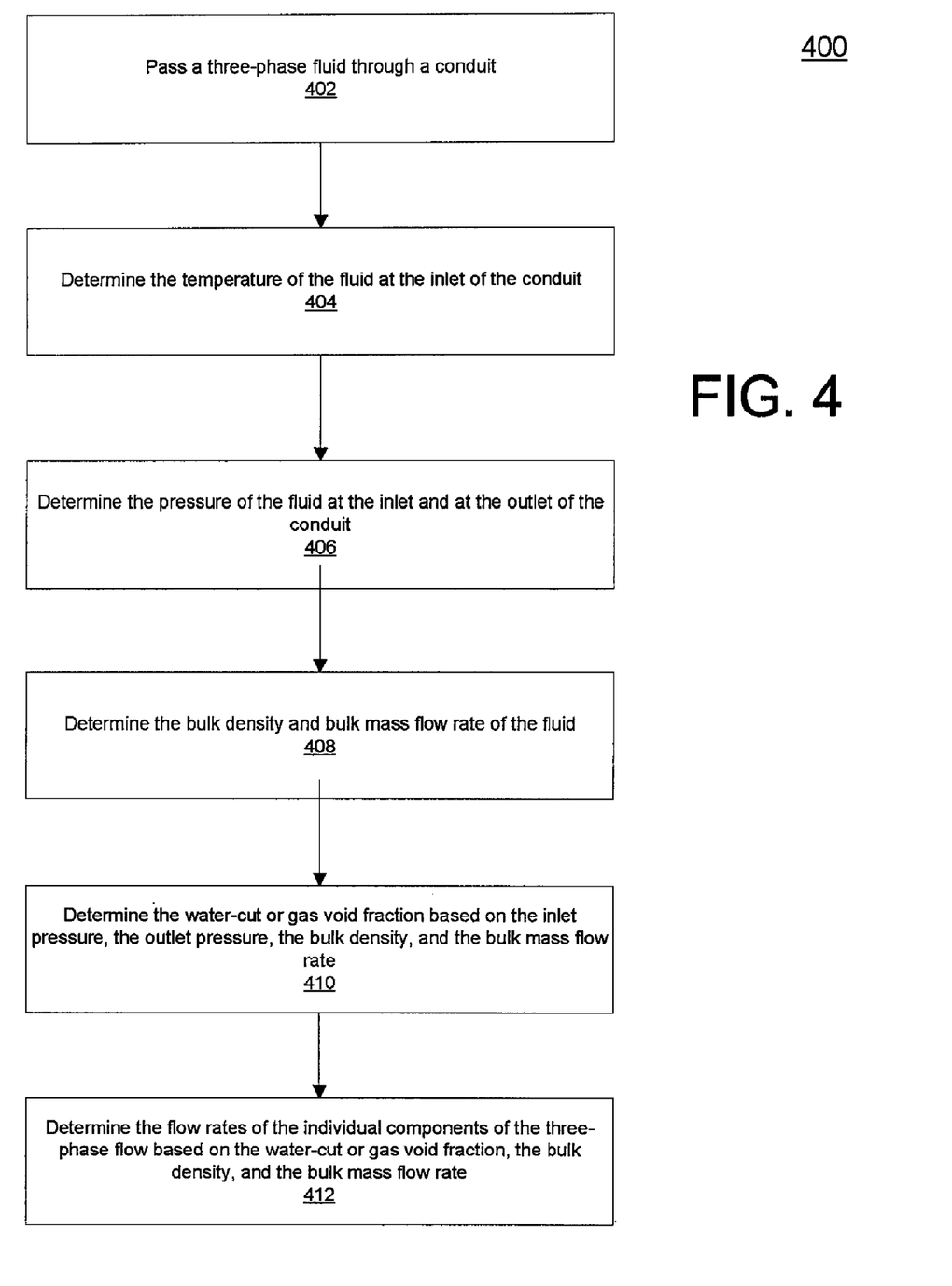
FIG. 4 shows a flowchart illustrating one implementation of a process for determining properties of individual components of a three-phase fluid flow.

FIG. 4 shows a flowchart illustrating one implementation of a process 400 for determining properties of individual components of a three-phase fluid flow. The implementation determines the mass flow rates of the individual components of a oil-water-gas fluid based on the bulk mass flow rate, the bulk density, the inlet temperature, and the inlet and outlet pressure of the fluid as it passes through a conduit. The process may be performed by, or in conjunction with the flowmeter system 2100, or the process 300 may be adapted to a different system.

A three-phase fluid, such as an oil-water-air mixture, is passed through a conduit (402). The temperature of the fluid at the inlet of the conduit is determined (404). The pressure of the fluid at the inlet and at the outlet of the conduit is determined (406). In addition, the bulk density and the bulk mass flowrate of the three-phase fluid is determined (408). The water-cut or gas void fraction of the fluid is determined based on the inlet pressure, the outlet pressure, the bulk density, and the bulk mass flow rate (410). For example, a mathematical model of the flow of the fluid through the conduit or a trained neural network may be used to determine the water-cut or gas void fraction. When the mathematical model is used, known values of the densities of the individual components also may be used in the model to determine the water-cut or gas void fraction. The flow rates of the individual components of the three-phase flow are then determined based on the water-cut or gas void fraction, the bulk density, and the bulk mass flow rate (412).

For example, when used in conjunction with flowmeter system 2100, the conduit is the Coriolis flowtube such that the three-phase fluid is passed through the Coriolis flowtube. The temperature sensor 220 is used to sense the temperature of the fluid at the inlet of the flowtube 215 and the pressure sensor or sensors 225 may be used to sense the inlet and outlet pressures of the flowtube 215. The Coriolis meter 237 measures the bulk density and the bulk mass flow rate of the fluid passing through the flowtube. The component flow rate determination system 2130, in conjunction with the flow model 2120, then determines the actual water-cut of the fluid based on the inlet pressure, the outlet pressure, the bulk density, and the bulk mass flow rate and determines the mass flow rates of the individual components of the three-phase flow based on the water-cut or gas void fraction, the bulk density, and the bulk mass flow rate.

Figure 5:
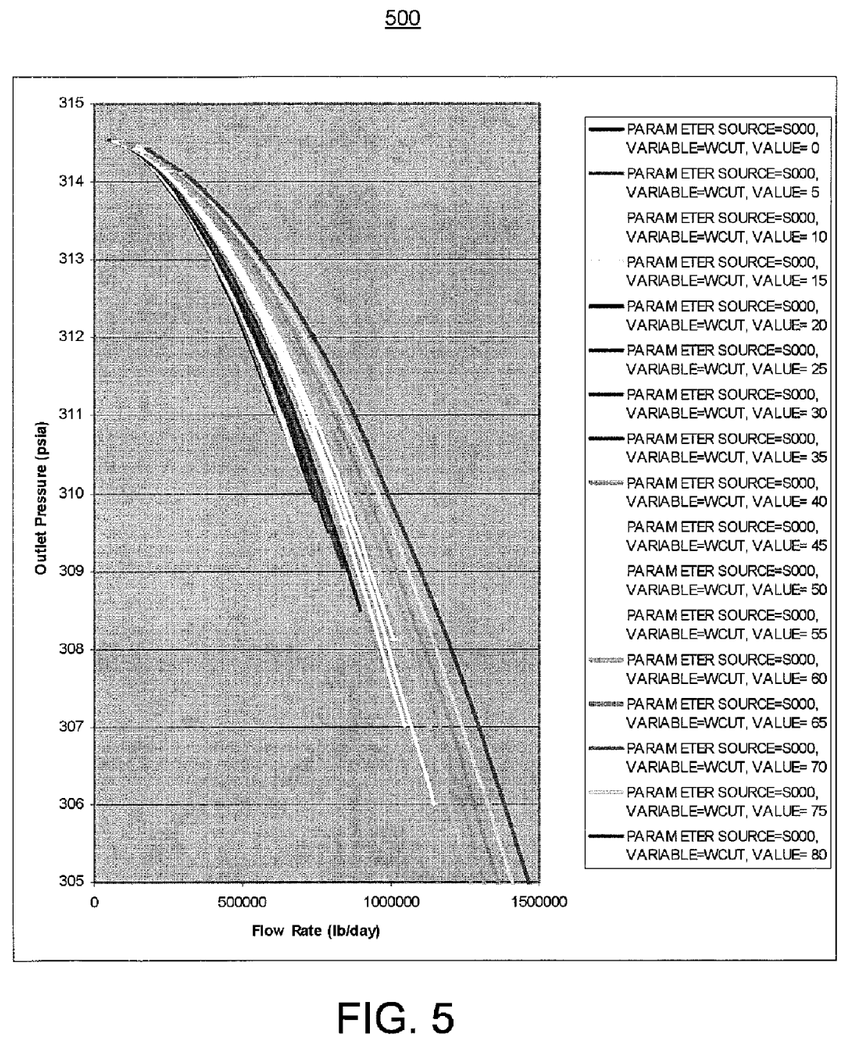
FIG. 5 illustrates a sample nodal plot 500 illustrating a coriolis meter's pressure sensitivity to water-cut.

FIG. 5 illustrates a sample nodal plot 500 illustrating a coriolis meter's pressure sensitivity to water-cut. The plot shows the change in outlet pressure as a function of flow rate, with water-cut as the parameter that varies with each curve. Based on the plot, it can be noted that near the lower ranges of flow rate, for a given coriolis flowtube size, the curves become much closer and it may be harder to distinguish between different water-cuts. Therefore, an appropriately sized coriolis flowtube should be used for the expected ranges of flow, so that sufficient pressure differentiation can be obtained for changing water-cut.

The foregoing techniques were tested by developing a Pipephase-network model to model the flow through the a CFT50-3 Coriolis meter from Invensys Systems, Inc. The 'coriolis-meter-network' included a flow through two identical parallel paths (loop) representing the coriolis-meter-flow tubes. These parallel links consisted of bends and pipe-sections, which correspond to the flow geometry of the meter. Specifically, the model included short pipe segments interspersed with BEND devices. The KMULs (described below, and used for the Pipephase simulation) for each bend were implicitly restricted to be of equal value for the lack of any discriminating information to justify any other KMUL value distribution and to make it easier/tractable to analyze the results.

KMUL is in calculations related to pressure drop across a bend. Pressure drop across a bend can be generally represented as:

$$DP = Kmul * f1(w, \rho, d, \mu) * f2 (\text{multi-phase flow effects})$$

Kmul is L/D, which is a characteristic of a bend and can be obtained from a single-phase flow test pressure drop data. f1 is the term that depends on mass flow rate w, fluid density $\rho$, flow diameter d and viscosity $\mu$. This data is available from thermodynamic property calculations in Pipephase. f2 is the term that accounts for multi-phase flow effects including flow pattern, and slip and compressibility. The Chisolm or Homogeneous model is used to calculate this term in Pipephase.

The fluid was modeled with a 3-component model of water, air and a pseudo-component oil-component. The model of the fluid assumed, with little loss in rigor, that the water component was in the water phase, the air component was in the vapor phase and the oil component was in the oil-phase (laboratory conditions were assumed). For modeling field conditions, a more rigorous model/algorithm may reflect a more accurate phase behavior.

The Pipephase model file for modeling the CFT50 flowtube and fluid is provided in Appendix B.

Two-phase air-water lab data was used to check the model fidelity and calibrate the model. Standard Pipephase case-study feature was used to run a large number of Pipephase case studies using the measured data.

Data over a wide range was fed into the model and the Bend KMUL (L/D) value was manually varied to match the pressure drop and flow rate for the given pressure drop. For modeling the pipes the BBMHV and Lockart-Martinelli models were tried. For the bends the HOMOGENEOUS model and the CHISOLM model were tried.

As described above, it was assumed that all bends have the same value of KMUL to simplify the model. For the Chisolm-bmhv combination a KMUL of 14 was found appropriate. For the Homogeneous-bbmhv combination a KMUL of 12 was found appropriate. Specifically, the Chisolm model with a KMUL=12 gave good results (average 1.18% error in flow) for the lower flow range (15 kg/s flow rates). The error was −6.6% for KMUL=14.35 and the homogeneous model gave better predictions for the higher flow ranges using a KMUL=14.375. So the KMUL value for each bend is expected to be in the 12 to 14 range overall.

This manual calibration can be easily automated in Pipephase by exposing BEND input data KMUL as an optimization (decision, constraint and objective variable). This data may be exposed in 3 ways (a) Individual Bend Variable for KMUL (b) KMUL for all bends in a link (KMUL_BEND_IN_LINK and (c) KMUL for all bends in a network (KMUL_BEND_IN_NETW). If this enhanced feature is developed in Pipephase, more accurate, faster automatic calibration to lab-measured data may be possible.

The simulation trials indicated that (a) the Chisolm model in combination with the BBMHV pipe model has the highest fidelity for lower range flow rates when slip is more present or dominant and (b) the Homogeneous Bend model in combination with the BBM HV pipe model has the highest fidelity for higher range flow rates when slip becomes insignificant. This observation is consistent with expected behavior.

The following table summarizes the flow results generated so far for specified pressure drops.

|  | Flow ranges | | |
| --- | --- | --- | --- |
|  | 15 kg/s | 19 kg/s | 23 kg/s |
| KMUL | 12 | 12 | 12 |
| Chisolm model average flow error % | 6.617% | 4.34% | 1.18% |
| Homogeneous model average flow error % | = | = | = |
| KMUL | 14.35 | 14.35 | 14.35 |
| Chisolm model error % | −1.67% | −3.77% | −6.63% |
| Homogeneous model average flow error % | +6.42% | 1.40% | −2.01% |

A FORTRAN driver routine was developed to call Pipephase via the Pipephase API so as to implement an algorithm to implement the component flow rate determination system 2130, with Pipephase implementing the flow model 2120. The driver program is included in Appendix A.

The driver program was developed to reflect a Laboratory/Field Coriolis meter measurement scenario. The Coriolis meter outputs 5 quantities (a) the bulk mass flow rate, (b) the bulk density, (c) the inlet pressure (d) the outlet pressure, and (e) the inlet temperature. Three additional constants are also used: (1) in-situ gas density (2) in-situ water density (3) in-situ oil density. The driver program reads the Coriolis measured data from an *.csv file, sends the data to the underlying coriolis network model, and calculates the outlet pressure Pout as a function of a fine grid of water-cut values that vary from 0% water cut to 100% water cut while keeping the bulk mass flow rate and bulk density constant. The curve of Pout vs. Wcut is then interpolated for water-cut for the measured value of outlet pressure.

The algorithm was tested for the underlying Chisolm model. The generated results revealed that the curve generated was not a smooth and monotonically changing curve. So a straight line interpolation scheme between data points should be used to get reasonable results. A higher order interpolating scheme may yield erratic results.

The algorithm also was tested for the underlying HOMOGENEOUS model. The Pout vs Wcut curve generated was smooth. From this it can be concluded that the HOMOGENEOUS model has more desirable mathematical properties in comparison to the Chisolm model even though the latter may reflect the conditions that actually occur, especially in the lower ranges of meter flow when the slip may be significant.

What is claimed is:

1. A system comprising:
a Coriolis flowmeter configured to measure a value of a first property of a multi-phase fluid, the Coriolis flowmeter including a conduit;
a sensor configured to measure a value of a second property of the multi-phase fluid;
a flow model of the flow of the multi-phase fluid through the conduit, the flow model configured to model a relationship between the second property and a third property of the multi-phase fluid, the relationship being dependent on the first property of the multi-phase fluid; and
a determination system configured to determine a value of the third property of the multi-phase fluid based on the flow model, the measured value of the first property and the measured value of the second property of the multi-phase fluid, and configured to determine a value of a fourth property of the multi-phase fluid based, at least in part, on the determined value of the third property and at least one of the measured value of the first property and the measured value of the second property.

2. The system of claim 1 wherein the second property is a pressure associated with the multi-phase fluid.

3. The system of claim 1 wherein the second property is a temperature associated with the multi-phase fluid.

4. The system of claim 1 wherein:
the determination system is configured to determine the value of the fourth property of the multi-phase fluid based, at least in part, on the measured value of the first property, the measured value of the second property, and the determined value of the third property.

5. The system of claim 1 wherein the fourth property is a mass flow rate or a volumetric flow rate of a component of the multi-phase fluid.

6. A system comprising:
a bulk density measurement system to measure a bulk density of a multi-phase fluid;
a mass flow rate measurement system to measure a bulk mass flow rate of the multi-phase fluid;
a pressure sensor configured to measure a pressure associated with the multi-phase fluid;
a flow model configured to determine water-cut or gas void fraction of the multi-phase fluid based on a relationship between the bulk mass flow rate and the water cut or gas void fraction, and based, at least in part, on the measured pressure;
a flow rate determination system to determine a flow rate of at least one component of the multi-phase fluid based on the bulk density, the bulk mass flow rate, and the water-cut or gas void fraction.

7. A method comprising:
measurinag a value of a first property of a multi-phase fluid using a Coriolis flowmeter, the Coriolis flowmeter including a conduit;
measuring a value of a second property of the multi-phase fluid;
determining a value of a third property of the multi-phase fluid based on the measured value of the first property and the measured value of the second property of the multi-phase fluid using a mathematical model of a relationship between the second property and the third property of a flow of the multi-phase fluid through the conduit, the relationship being dependent on the first property of the multi-phase fluid flow; and determining a value of a fourth property of the multi-phase fluid based, at least in part, on the determined value of the third property and at least one of the measured value of the first property and the measured value of the second property.

8. The method of claim 7 wherein the second property is a pressure associated with the multi-phase fluid.

9. The method of claim 7 wherein the second property is a temperature associated with the multi-phase fluid.

10. The method of claim 7 wherein determining the value of the fourth property of the multi-phase fluid comprises determining the value of the fourth property based, at least in part, on the measured value of the first property, the measured value of the second property, and the determined value of the third property.

11. The method of claim 7 wherein the fourth property is a mass flow rate or a volumetric flow rate of a component of the multi-phase fluid.

12. A method comprising:
measuring a bulk density of a multi-phase fluid;
measuring a bulk mass flow rate of the multi-phase fluid;
measuring a pressure associated with the multi-phase fluid;
modeling a relationship between pressure and water cut or gas void fraction based on the measured bulk mass flow rate;
determining a water-cut or gas void fraction of the multi-phase fluid based, at least in part, on the model and measured pressure; and
determining a flow rate of at least one component of the multi-phase fluid based on the measured bulk density, the measured bulk mass flow rate, and the determined water-cut or gas void fraction.

13. A method comprising:
measuring a bulk density of a multi-phase fluid using a Coriolis flowmeter, the Coriolis flowmeter including a flowtube;
measuring a bulk mass flow rate of the multi-phase fluid using a Coriolis flowmeter;
measuring an inlet pressure of the multi-phase fluid at an inlet of the flowtube;
measuring an outlet pressure of the multi-phase fluid at an outlet of the flowtube;
measuring an inlet temperature of the multi-phase fluid at the inlet of the flowtube;
determining a water-cut or gas void fraction of the multi-phase fluid based on the bulk density, the bulk mass flow rate, the inlet pressure, the outlet pressure, and the inlet temperature; and
determining a flow rate of at least one component of the multi-phase fluid based on the measured bulk density, the measured bulk mass flow rate, and the determined water-cut or gas void fraction.

14. The method of claim 13 wherein determining the water-cut or gas void fraction of the multi-phase fluid comprises using a mathematical model of a flow of the multi-phase fluid through the flowtube to determine the water-cut or gas void fraction of the multi-phase fluid based on the bulk density, the bulk mass flow rate, the inlet pressure, the outlet pressure, and the inlet temperature.

* * * * *

UNITED STATES PATENT AND TRADEMARK OFFICE
CERTIFICATE OF CORRECTION

| | | |
|---|---|---|
| PATENT NO. | : 7,614,312 B2 | Page 1 of 1 |
| APPLICATION NO. | : 11/780918 | |
| DATED | : November 10, 2009 | |
| INVENTOR(S) | : Santanu Barua et al. | |

It is certified that error appears in the above-identified patent and that said Letters Patent is hereby corrected as shown below:

Column 12, Line 58, delete "measurinag" and insert -- measuring --.

Signed and Sealed this

Fifteenth Day of June, 2010

David J. Kappos
*Director of the United States Patent and Trademark Office*